United States Patent [19]

Campbell, Jr.

[11] 4,290,457

[45] Sep. 22, 1981

[54] TRUNCATED TRIANGULAR INSULATOR

[76] Inventor: Frank Campbell, Jr., 2274 Broadlawn, Houston, Tex. 77058

[21] Appl. No.: 90,814

[22] Filed: Nov. 2, 1979

[51] Int. Cl.[3] .......... F16L 9/10; F16L 9/22; F27B 9/14; F27D 3/02

[52] U.S. Cl. .......... 138/149; 138/147; 432/234

[58] Field of Search .......... 138/147, 155, 149, 178; 432/233, 234, 235

[56] References Cited

U.S. PATENT DOCUMENTS

| | | | |
|---|---|---|---|
| 3,214,152 | 10/1965 | Molz . | |
| 3,236,507 | 2/1966 | McKie . | |
| 3,367,641 | 2/1968 | Molz . | |
| 3,451,661 | 6/1969 | Barker . | |
| 3,552,729 | 1/1971 | Oberhausen . | |
| 3,642,261 | 2/1972 | Laws . | |
| 3,706,448 | 12/1972 | Salter et al. . | |
| 3,941,160 | 3/1976 | Campbell | 138/178 |
| 4,015,636 | 4/1977 | Van Fossen | 138/149 |
| 4,056,350 | 11/1977 | Knaak | 432/234 |

FOREIGN PATENT DOCUMENTS

| | | | |
|---|---|---|---|
| 2505130 | 8/1976 | Fed. Rep. of Germany | 432/234 |
| 2296831 | 7/1976 | France | 432/234 |

*Primary Examiner*—James E. Bryant, III
*Attorney, Agent, or Firm*—Fulbright & Jaworski

[57] ABSTRACT

An insulator suitable for use with a truncated triangular shaped support member or skid pipe having a base member, a pair of converging side members which terminate in an apex member and a pair of shoulders extending oppositely one another from the joinder of the apex member and each corresponding side member. The insulator includes a base unit and a pair of converging side walls. When slidingly received around the skid pipe, the insulator closely conforms to the periphery of the base member and side members of the skid pipe. The side walls of the insulator preferably abut a lower lip of each shoulder so that molten slag and other impurities cannot migrate between the insulator and the skid pipe to degrade and dislodge the insulator.

The insulator is secured to the support member by its novel geometry; that is, when the insulator is slidingly received around the structural member, the converging side walls of the insulator bear against the converging side members of the structural member thereby maintaining the insulator in proper position on the structural member.

20 Claims, 6 Drawing Figures

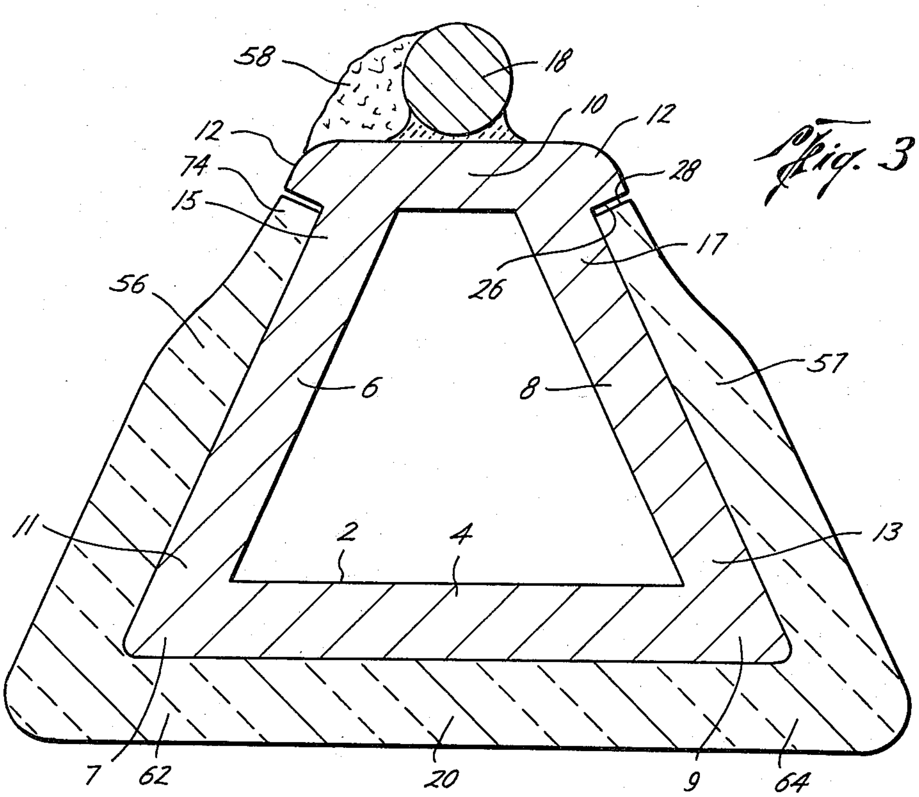
Fig. 3
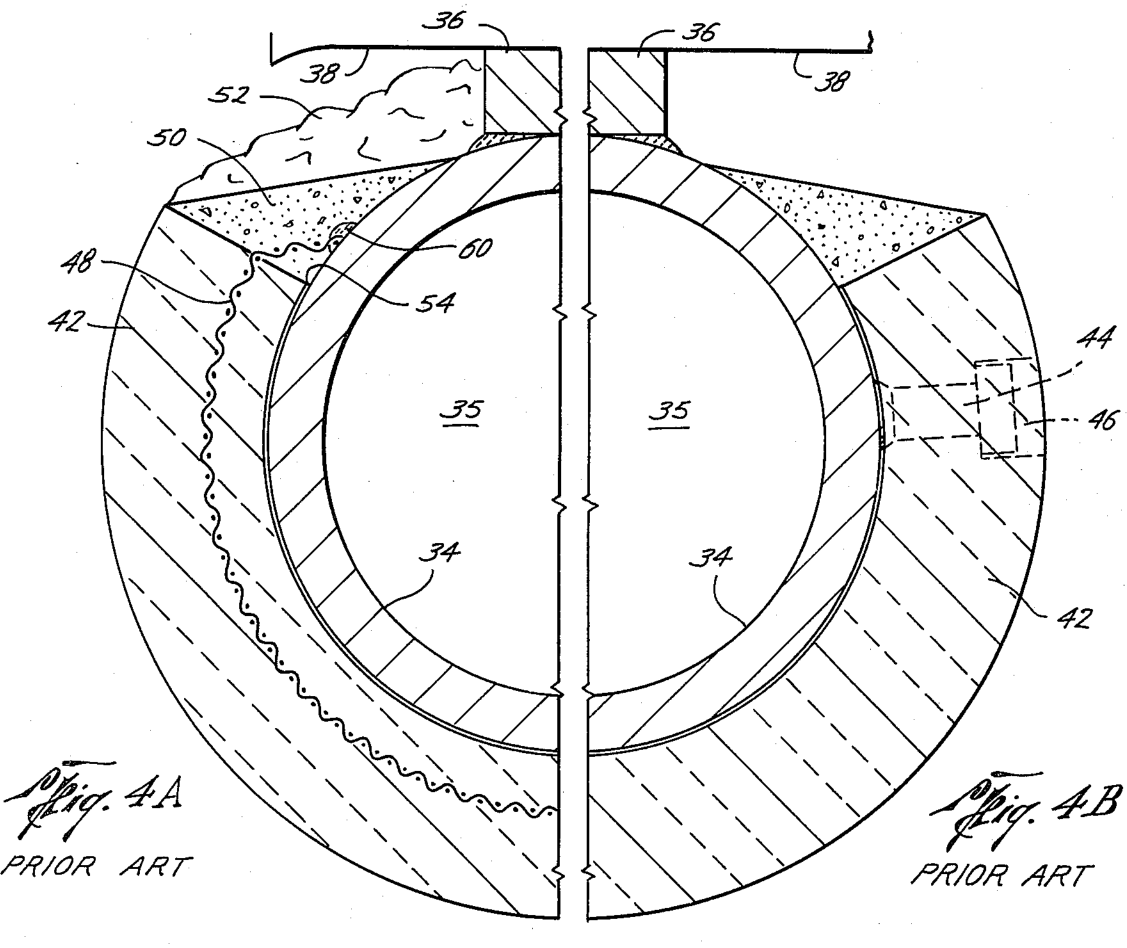
Fig. 4A
PRIOR ART
Fig. 4B
PRIOR ART

TRUNCATED TRIANGULAR INSULATOR

CROSS REFERENCES

None.

BRIEF SUMMARY OF THE INVENTION

1. Background of the Invention

In furnaces used throughout the metallurgical and related industries to heat a slab, billet, bloom or other steel shape, a typical pusher furnace includes a complex network of vertical and horizontal water-cooled pipes which supprt an additional network of horizontal water-cooled skid rails along which the metal shapes are pushed through the furnace. The metallurgical furnace is an open system; that is, heat which is transferred to the metal pipe network is conducted by the flowing water in the pipes to a point outside the furnace and is thus not recoverable. Accordingly, vast amounts of heat losses occur and correspondingly unnecessary amounts of energy are expended to replace the heat loss through the pipes.

Historically, insulators have failed for several reasons. For instance, because of the severe vibrations set up in the skid rails and pipe network as the metal shapes are pushed through the furnace, the mechanical fastening devices which secure the refractory or insulator to the pipe breaks thereby permitting the insulator to fall from the pipe. Additionally, especially regarding the skid pipe and insulator, high temperature slag is deposited around the uppermost portion of the skid pipe which in turn migrates downwardly and into the seams between the insulator and the skid pipe. Hence, the high temperature slag degrades the insulator from within, and causes large pieces of the insulator to break off and fall to the furnace floor.

There has, therefore, been a long felt need in the steel industry for an insulator which reduces the migration of the slag into the seams between the insulator and the pipe, and a long felt need for a means to secure an insulator to a support structure such as a skid rail or cross pipe which will remain in place around the support structure during furnace operations.

2. Statement of the Prior Art

The following statement of the prior art is filed pursuant to 37 C.F.R. 1.97 and 1.98 and represents the most pertinent prior art of which the applicant is aware. In accordance with 37 C.F.R. 1.98(b), photocopies of the patents mentioned below are appended hereto.

| U.S. Pat. No. | Name |
|---|---|
| 3,941,160 | Campbell |
| 3,451,661 | Barker |
| 4,015,636 | Van Fossen |
| 4,056,350 | Knaak |
| 3,706,448 | Salter, et al |
| 3,642,261 | Laws |
| 3,367,641 | Molz |
| 3,552,729 | Oberhausen, et al |
| 3,236,507 | McKie |
| 3,214,152 | Molz |

The device in the U.S. Pat. No. 3,941,160 relates to a dense, preburned ceramic refractory formed in interlocking shapes which are positioned by a number of studs 35 welded to the crosspipe which are received by the arcuate recesses 17 in the refractory shape. The U.S. Pat. No. 3,941,160 device is intended for use around a crosspipe but not a skid pipe as in the present invention.

A ceramic blanket is positioned between the water pipe and the preburned ceramic tile. The massive weight of the preburned ceramic tile induces the fracture of the studs which support the refractory. Moreover, the seams which are formed within each pair of interlocking segments are fully exposed to slag migration.

The device in the U.S. Pat. No. 3,451,661 involves an interlocking outer refractory layer unsupported by studs welded to the pipe. The amount of time and labor expended in interlocking the numerous outer pieces is significant as is the number of seams defined by the individual pieces. The U.S. Pat. No. 3,451,661 device is most easily used when applied to vertical pipes and is not suitable for use with a skid pipe.

The U.S. Pat. No. 4,015,636 device again uses a preburned ceramic tile material having an inner layer of semi-cylindrical tiles held together on the pipe by a "C"-shaped ceramic refractory collar which is slid over the split tiles as they are held together. Again, the labor and time expended in insulating the pipe is less than satisfactory. Moreover, FIG. 5 shows the conventional use of a refractory cement to cover the margins between the pipe and insulator from the harmful effects of slag migration.

The device in the U.S. Pat. No. 4,056,350 shows an insulator 3 which is partially protected from falling work pieces by intermittent pieces 7; however, between the pieces 7 and 8, the insulator remains exposed to the effects of slag migration and, unlike the present invention, is not maintained on the structure by its geometry.

The device in the U.S. Pat. No. 3,706,448 shows an insulator 17 with a wire mesh 18 welded to the pipe. Again, the insulator is exposed to the effects of slag migration, and, even with the converging side configuration, when the wire mesh is broken, the insulator falls from the structure 9.

The device in the U.S. Pat. No. 3,642,261 again shows a wire mesh 16 welded at point 17 and requires the use of a refractory filling material 18 to seal the gaps between the refractory and the pipe from the effects of slag migration.

The device in the U.S. Pat. No. 3,367,641 discloses an exposed insulator 21 exposed to the effects of slag migration and insulator 21 exposed to the effects of slag migration and having none of the benefits of the novel geometric shape of the present invention.

The device in the U.S. Pat. No. 3,552,729 discloses an insulator 11 which is not discussed by number in the description of the preferred embodiments. The U.S. Pat. No. 3,236,507 discloses a device having an insulator 16 which is fully exposed to the effects of slag migration and does not include the novel geometric design of the present invention.

Finally, the device in the U.S. Pat. No. 3,214,152 includes a heat-resistant means 7, 8, not acting as or intended to be an external insulator as such, and an insualtor 2 which is again fully exposed to the effects of slag migration and does not include the advantages of the novel geometric design of the present invention.

3. The Present Invention

The present invention relates to a self-supporting insulator suitable for use with a support member such as a skid pipe in a metallurgical reheat furnace. The present invention is suitable for use in combination with a truncated triangular support structure or skid pipe having a base member, a pair of converging side members whose uppermost ends are spaced apart and secured to an apex member thereby forming a truncated triangle shape with a passageway suitable for flowing a fluid therethrough. The skid pipe, with which the new insulator is used, also includes a pair of outwardly projecting shoulders including a lower lip under each shoulder. The shoulders serve at least two purposes: (i) to improve the physical characteristics of the support member, and (ii) to provide a shield for the new insulator against slag migration into the area between the insulator and the support member.

When the combination of the support member and the novel insulator design is used as a skid pipe, the present invention includes a base unit, a pair of converging side walls whose uppermost ends are spaced apart from one another. The base unit and side walls of the unique and new insulator closely conform to the periphery of the base member and side members of the support member. Hence, the unique design of the present invention permits the insulator to be slidingly received around the skid pipe. The unique design of the present invention calls for the converging side walls of the insulator to bear against and abut the side members of the structural member thereby effectively securing and positioning the insulator to the structural member without the use of any other mechanical securing device. Hence, there are no failures of welded studs, buttons or wire mesh because the present invention has eliminated the need for such devices.

Preferably, the converging side walls of the insulator are in close proximity to the lower lips of the projecting shoulders. Because the lower lips of the projecting shoulders are sufficiently misaligned from the vertical, the novel insulator design greatly reduces or eliminates the migration of slag between the insulator and the support member as the slag accumulates at the apex of the support member.

It is therefore an object of the present invention to provide an insulator suitable for use with a support member which, when utilized as an insulated skid pipe, reduces the effects of slag migration into the margins between the insulator and the support member.

It is a further object of the present invention to provide an insulator for a support member used as a skid pipe which, when applied to the support member, can be held in place without the use of conventional studs, buttons, or wire mesh being welded to the support member.

Yet another object of the present invention is to provide an insulator which, when used with a skid pipe in a metallurgical reheat furnace, reduces the number of exposed margins within the insulator.

An even further object of the present invention is to provide an insulator which, when used with a skid pipe, can be easily and quickly applied to the skid pipe.

These and other objects of the present invention will become readily apparent when read in light of the description of the preferred embodiment, the claims and the drawings appended hereto.

BRIEF DESCRIPTION OF THE DRAWINGS

FIG. 3 is an elevational view in cross-section of another embodiment of the present invention as used to insulate a skid pipe, further showing an accumulation of slag on top the apex member of the structural member.

FIG. 4A is a partial elevational view in cross-section of an embodiment of the prior art including a circular pipe, a skid welded on top the pipe, a partially surrounding circular insulator anchored to the pipe with welded wire mesh, and a mortar seal and a representation of a portion of a metal shape on top the skid.

FIG. 4B is a partial elevational view in cross-section of another embodiment of the prior art including a circular pipe, a partially surrounding circular insulator, a mortar seal and a stud welded to the pipe which supports the refractory around the pipe.

DESCRIPTION OF THE PREFERRED EMBODIMENTS

Figure 1:
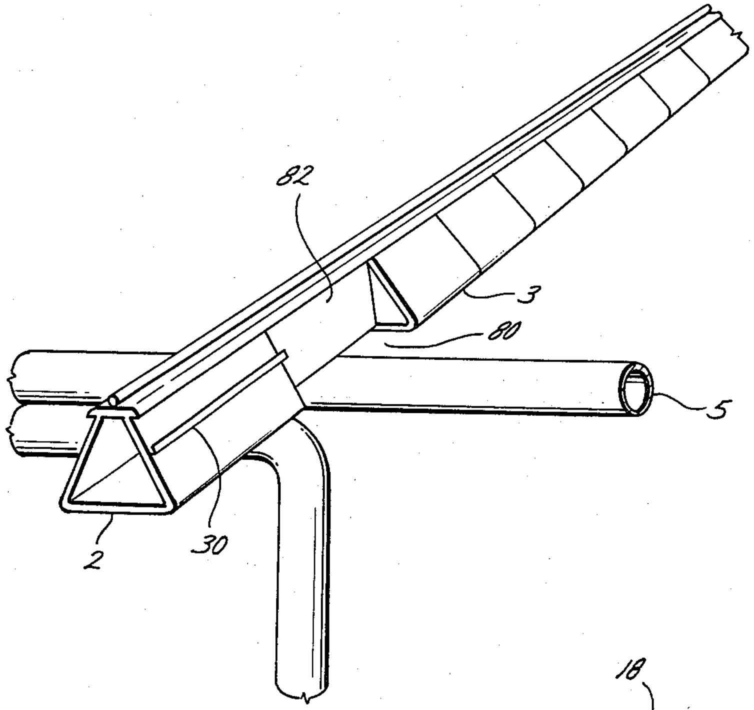
FIG. 1 is a view in perspective showing a segment of a reheat furnace including a portion of an insulated skid pipe in accordance with the present invention.

As shown in FIG. 1, a section of a structural member 2 serves as a water-cooled skid pipe supported by a series of cross pipes, one cross pipe 5 being representative of the series. A conventional skid pipe 34 as shown in FIGS. 4A and 4B is representative of a skid pipe in common use throughout the industry today. A skid 36 is welded on top the skid pipe 34, which skid directly supports a metal shape or workpiece 38 as partially shown in FIG. 4. A passageway 35 is defined within the pipe 34 through which passageway cool water is flowed in order to reduce the operating temperature of the skid pipe in the furnace. A heavy pre-fired refractory or insulator 42 surrounds a portion of the skid pipe 34. Because of the weight and configuration of the conventional insulator 42, an additional means to secure the insulator 42 in location around the skid pipe 34 is required. Typically, a wire mesh 48 which is secured to the insulator 42 is welded to the skid pipe 34 at a point 60 as shown in FIG. 4A. Another conventional means for securing the insulator 42 around the skid pipe 34 is the welding of a support stud 44 to the skid pipe 34, which welding stud is received within a recess 46 in the insulator 42 as shown in FIG. 4B.

As shown in FIGS. 4A and 4B, metal slag 52 accumulates on the skid pipe 34 during furnace operation. When the slag 52 migrates into the margin 54 between the insulator 42 and the skid pipe 34, the slag 52 then surrounds the insulator 42 on both sides thereby causing it to fracture and fall away from the skid pipe 34.

In any event, the studs 44 continuously degrade in the high furnace temperatures and break away from the skid pipe 34 as the skid pipe vibrates during furnace operations. The net result is that the insulator 42 quickly falls away from the skid pipe 34 thereby directly exposing the skid pipe 34 to the high furnace temperatures and corrosive convective gases within the furnace. A refractory cement 50 is disposed as shown in FIGS. 4A and 4B in order to reduce the migration of the slag 52 into the margin 54. Because of the brittle nature of the refractory cement 50, the cement cracks under the flexion and vibration of the skid pipe and permits migration of the slag 52 between the insulator 42 and the skid pipe 34. The prior art as represented by FIGS. 4A and 4B therefore has proven less than satisfactory.

Figure 2:
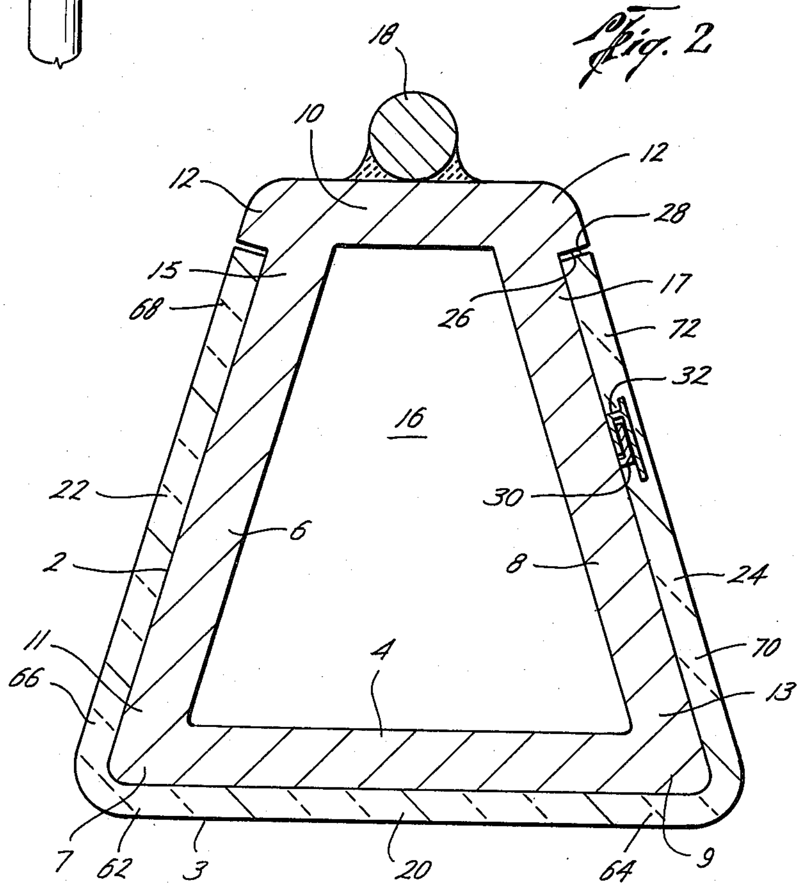
FIG. 2 is an elevational view in cross-section of the new insulator shape when used to insulate a skid pipe.

The present invention as illustrated in FIGS. 2 and 3 comprises an insulator 3 suitable for use with a truncated triangular skid pipe 2 having outwardly projecting shoulders 12. The skid pipe itself comprises a base member 4 having first and second ends 7 and 9 respectively. A pair of converging side members 6 and 8 converge in a direction away from the base member 4. The side member 6 has a lower end 11 and an upper end 15 while the side member 8 has a lower end 13 and an upper end 17. The side walls 6 and 8 join an apex member 10 having a pair of shoulders 12 projecting outwardly generally from the points where the upper ends of the side members 6 and 8 are secured to the apex member 10. The resulting truncated triangular shaped skid pipe 2 defines a passageway 16 therethrough suitable for conducting a fluid, and is preferably a seamless, integral extruded pipe. A conventional skid 18, which could be rectangular in accordance with the prior art, can be welded or extruded onto the apex member 10.

The present invention as shown in FIGS. 2 and 3 is a truncated triangular insulator 3 having a base unit 20 with first and second ends 62 and 64. A first side wall 22, having a lower end 66 and an upper end 68, and a second side wall 24, having a lower end 70 and an upper end 72, converge, but the upper ends 68 and 72 remain spaced apart. The lower ends 66 and 70 of the side walls are secured to and preferably integral with the ends 7 and 9 respectively of the base unit. As shown in FIGS. 2 and 3, the truncated triangular-shaped insulator 3 closely conforms to the periphery of and substantially surrounds the base member 4 and side walls 6 and 8 of the skid pipe 2. The insulator 3 can be manufactured from any suitable insulating material such as, for example, ramming mixes, plastic, prefired vibrocast refractory tiles, dry pressed prefired or chemically bonded refractory tiles, hydraulic or chemically bonded castable refractory tiles, and ceramic fiber materials.

Preferably, the upper end 68 of the side wall 22 and/or the upper end 72 of the side wall 24 extends outwardly no farther than the corresponding shoulder. As shown in FIG. 2, the margin defined by the lower lip 26 of the shoulder and the face 28 of the upper end of the insulator is sufficiently misaligned from the vertical to reduce the deleterious effects of slag migration as the slag 58 as exemplified in FIG. 3 is deposited on top the apex member 10.

As shown in another embodiment of the invention in FIG. 3, the side walls 56 and 57 of the insulator can extend outwardly farther than the side walls 22 and 24 as shown in FIG. 2 in order to increase the amount of insulation around the skid pipe 2. Preferably, however, the upper ends 74 and 76 of the side walls 56 and 57 as shown in FIG. 3 extend outwardly no farther than their corresponding shoulders 12 as shown in both FIGS. 2 and 3. Hence, the harmful effects of slag migration between the lower lip of the skid pipe shoulder and the face of the upper end of the surrounding insulator have been materially reduced.

The novel geometry of the insulator 3 of FIG. 2 provides yet another unique and beneficial result. Because the side walls 22 and 24 of the insulator closely conform to the converging side members 6 and 8 respectively of the skid pipe 2, the side walls of the insulator abut and bear against the corresponding side members of the skid pipe, Hence, the novel geometric design of the insulator 3 when used with a skid pipe having converging walls, permits the insulator 3 to maintain its position around the skid pipe without the use of other mechanical securing devices such as wire mesh or metal studs welded to the skid pipe. Hence, because there are no mechanical interlock devices between the insulator and the skid pipe, the insulator does not fall away from the skid pipe due to failures of any mechanical interlock devices. The insulator 3, therefore, enjoys a longer, more effective life in the furnace.

The insulator, however, can be, but need not necessarily be, secured to the skid pipe by use of a support rib 30 axially aligned along at least one side member of the skid pipe which is slideably received within a compatible recess 32 in the corresponding side wall of the insulator. A portion of the skid pipe 2 as shown in FIG. 1 includes the support rib 30.

Figure 5:
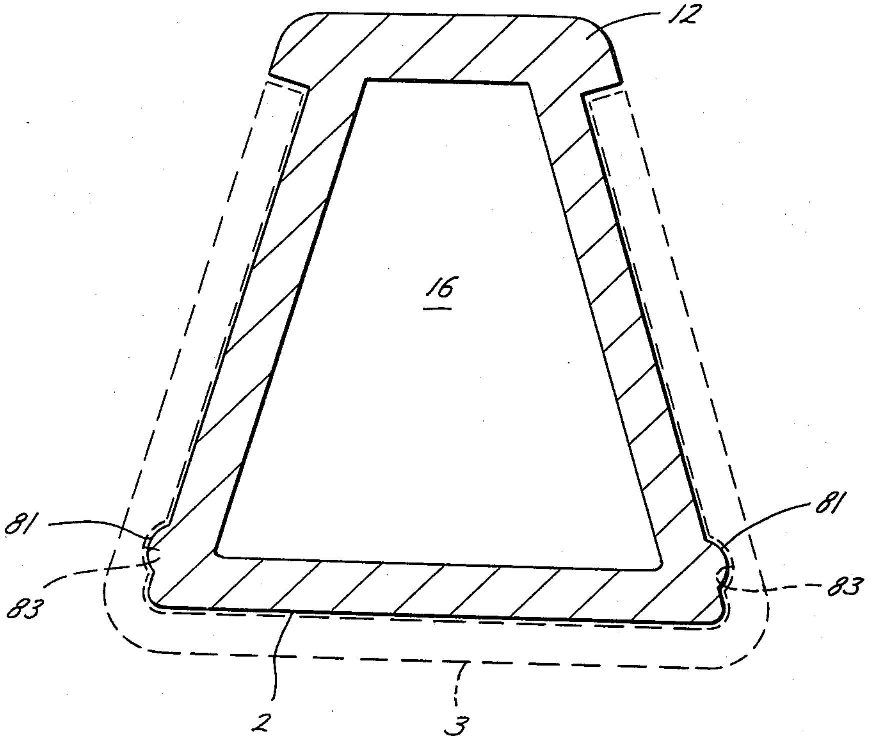
FIG. 5 is another embodiment of the present invention additionally showing the nodules on the converging side members of the pipe which are received in corresponding recesses in the new insulator.

Another suitable embodiment is shown in FIG. 5. The nodules 81 of the skid pipe closely conform to the recesses 83 in the insulator thereby further supporting the invention on the skid pipe. The nodule 81 can be located anywhere along the exterior of the side member so long as the recess 83 of the insulator is correspondingly positioned to receive the nodule.

As shown in FIG. 1, the insulator 3 is quickly and efficiently applied to the skid pipe 2 by aligning the insulator 3 in a cutaway 80 so that a rail 82 is received through the spaced apart upper ends of the insulator. The insulator is then slidingly received around the skid pipe 2 until it abuts an adjacent segment of the insulator. Clearly, the equipment, time and amount of labor expended in equipping the skid pipe with the new insulator are greatly reduced thereby reducing the expensive nonoperating time of the furnace itself.

The present invention therefore as described in the specification, illustrated in the drawings and claimed hereafter fully supports and meets the previously noted objects of the invention. Although a preferred embodiment has been described and claimed, it is understood that numerous modifications, amendments and alterations of structure can occur which clearly fall within both the spirit and the scope of the specification, drawings and claims herein.

What is claimed is:

1. An insulator for use in combination with a truncated triangular structural member including a base member having first and second ends, converging first and second side members having upper and lower ends, the lower ends of the first and second side members secured to the first and second ends of the base member respectively, the upper ends of the side members spaced apart and secured to an apex member and a pair of shoulders extending outwardly from each upper end of said side member in proximity to where the side members are secured to the apex member, each shoulder including a lower lip, the insulator comprising:

(a) a substantially straight base unit having first and second ends;

(b) first and second converging side walls having upper and lower ends, said first and second lower ends secured to the first and second ends respectively of the base unit and said upper ends in spaced apart relationship to one another; and (c) a support means formed by the abutment of the first and second converging side walls against the first and second side members respectively of the structural member for securing the insulator around the periphery of the base member and a substantial portion of the first and second side members respectively of the structural member.

2. The device of claim 1 wherein the insulator is in substantially intimate contact with the truncated triangular structural member.

3. The device of claim 1 wherein the means is at least one support rib axially aligned with the structural member and extending from either side member thereof, which rib is slideably received by a compatible recess in the corresponding side wall of the insulator.

4. The device of claim 1 wherein the support means includes at least one recess in the side wall of the insulator suitable for receiving a nodule on the side member of the structural member, said recess and nodule located below the centroid of the structural member.

5. The device of claim 1 wherein at least one upper end of the insulator is in close proximity to the lower lip of the corresponding shoulder.

6. The device of claim 1 wherein at least one margin defined by the face of the upper end of the insulator and the lower lip of the support member is inclined sufficiently from the vertical to reduce substantially the migration of metal slag from the apex member through said margin.

7. The device of claim 1 wherein the upper end of at least one side wall of the insulator, when disposed around the structural member, extends outwardly no farther than the corresponding shoulder.

8. The device of claim 1 wherein the means includes a cutaway in the support member terminating in a rail, the receiving the rail through the spaced apart upper ends of the insulator and the sliding reception by the support member of said insulator.

9. An insulator for use in combination with a truncated triangular structural member including a base member having first and second ends, converging first and second side members having upper and lower ends, the lower ends of the first and second side members secured to the first and second ends of the base member respectively, the upper ends of the side members spaced apart and secured to an apex member and a pair of shoulders extending outwardly from each upper end of said side member in proximity to where the side members are secured to the apex member, each shoulder including a lower lip, the insulator comprising:

(a) a substantially straight base unit having first and second ends;
(b) first and second side walls each having an upper and lower end, the lower ends of said first and second side walls secured to the first and second ends respectively of the base unit;
(c) wherein the side walls converge in a direction away from the base unit;
(d) said upper ends of the side walls each terminate in a face and are in spaced apart relationship to each other; and
(e) a slidably releasable support means for releasably securing the insulator to the structural member formed by the abutment of the first and second converging side walls against the first and second side members respectively of the structural member whereby the base unit, first and second side walls substantially surround the base member, first and second side members respectively of the structural member.

10. The device of claim 9 wherein the side walls of the insulator, when disposed around the structural member, extend from each side member substantially equidistantly with the corresponding shoulders.

11. The device of claim 9 wherein the support means is at least one support rib axially aligned with the support member and extending from at least one side member, which rib is slideably received within a compatible recess in the corresponding side wall of the insulator.

12. The device of claim 9 wherein the support means includes at least one recess in a side wall of the insulator which receives a corresponding nodule on the respective side member of the structural member, said recess and nodule located below the centroid of the structural member.

13. The device of claim 9 wherein the face of at least one upper end of the insulator is disposed in close proximity to the corresponding lower lip of the support member to form a margin.

14. The device of claim 13, wherein the margin is inclined sufficiently from the vertical to reduce substantially the migration of metal slag from the apex member within said margin.

15. A combination of an insulator and a pipe comprising a truncated triangular structural member including a base member having first and second ends, converging first and second side members having upper and lower ends, the lower ends of the first and second side members secured to the first and second ends of the base member respectively, the upper ends of the side members spaced apart and secured to an apex member and a pair of shoulders extending outwardly from each upper end of said side member in proximity to where the side members are secured to the apex member, each shoulder including a lower lip, and the insulator having:

(a) a substantially straight base unit having first and second ends;
(b) first and second side walls each having an upper and lower end, the lower ends of said first and second side walls secured to the first and second ends respectively of the base unit;
(c) wherein the side walls converge in a direction away from the base unit;
(d) said upper ends of the side walls each terminate in a face and are in spaced apart relationship to each other; and
(e) a support means formed by the abutment of the first and second converging side walls against the first and second side members respectively of the structural members for releasably securing the insulator to the structural member whereby the base unit, first and second side walls substantially surround the base member, first and second side members respectively of the structural member.

16. The device of claim 15 wherein the means is at least one support rib axially aligned with the support member and extending from at least one side member, which rib is slideably received within a compatible recess in the corresponding side wall of the insulator.

17. The device of claim 15 wherein the support means includes at least one recess in a side wall of the insulator which receives a corresponding nodule on the respective side member of the structural member, said recess and nodule located below the centroid of the structural member.

18. The device of claim 15 wherein the face of at least one upper end of the insulator is disposed in close proximity to the corresponding lower lip of the support member to form a margin.

19. The device of claim 18 wherein the margin is inclined sufficiently from the vertical to reduce substantially the migration of metal slag from the apex member within said margin.

20. The device of claim 15 wherein the side walls of the insulator, when disposed around the structural member, extend from each side member substantially equidistantly with the corresponding shoulders.

* * * * *